US009628572B2

(12) United States Patent
Smith et al.

(10) Patent No.: US 9,628,572 B2
(45) Date of Patent: **\*Apr. 18, 2017**

(54) METHOD AND PROCEDURE FOR DYNAMIC SERVICES ORCHESTRATION THAT RUNS WITHIN AN ON-DEVICE SOFTWARE CONTAINER

(71) Applicant: RELIANCE JIO INFOCOMM USA, INC., Plano, TX (US)

(72) Inventors: Nathan A. Smith, Frisco, TX (US); Matthew Oommen, Frisco, TX (US); Pallavur A. Sankaranaraynan, Frisco, TX (US)

(73) Assignee: RELIANCE JIO INFOCOMM USA, INC., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/045,109

(22) Filed: Feb. 16, 2016

(65) Prior Publication Data

US 2016/0173621 A1 Jun. 16, 2016

Related U.S. Application Data

(63) Continuation of application No. 13/922,045, filed on Jun. 19, 2013, now Pat. No. 9,264,304.

(Continued)

(51) Int. Cl.
*H04L 29/08* (2006.01)
*H04L 12/24* (2006.01)
(Continued)

(52) U.S. Cl.
CPC .......... *H04L 67/16* (2013.01); *H04L 41/0803* (2013.01); *H04L 67/02* (2013.01);
(Continued)

(58) Field of Classification Search
CPC ........ H04L 67/16; H04L 67/20; H04L 67/28; H04L 41/0803; H04L 67/02; H04W 4/001; H04W 4/003; H04W 4/206
See application file for complete search history.

(56) References Cited

U.S. PATENT DOCUMENTS 7,382,260 B2 6/2008 Agarwal et al.
7,401,131 B2 \* 7/2008 Robertson .............. G06Q 10/10
707/999.01

(Continued)

FOREIGN PATENT DOCUMENTS

| EP | 1179244 A1 | 2/2002 |
|---|---|---|
| RU | 2421811 C2 | 6/2011 |
| WO | 2013061156 A2 | 5/2013 |

OTHER PUBLICATIONS

The International Search report and the Written opinion issued by Russian Federal Institute of Industrial Property Office on Sep. 19, 2013 for the International Patent Application No. PCT/US2013/046640.

(Continued)

*Primary Examiner* — Michael C Lai

(74) *Attorney, Agent, or Firm* — Jackson Walker LLP; Christopher J. Rourk

(57) ABSTRACT

A system for providing network services is provided. The system includes a device configured to interface with the network to receive a container, where the container is configured to interface with an operating system of the device and a plurality of applications operating on the device. The container is further configured to interface with a network services provider of one or more network services and one or more third party service providers.

20 Claims, 2 Drawing Sheets

Related U.S. Application Data

(60) Provisional application No. 61/662,237, filed on Jun. 20, 2012.

(51) Int. Cl.
*H04W 4/00* (2009.01)
*H04W 4/20* (2009.01)

(52) U.S. Cl.
CPC .............. *H04L 67/20* (2013.01); *H04L 67/28* (2013.01); *H04W 4/001* (2013.01); *H04W 4/003* (2013.01); *H04W 4/206* (2013.01)

(56) References Cited

U.S. PATENT DOCUMENTS

| | | | |
|---|---|---|---|
| 7,496,360 B2 | 2/2009 | Sindhwani et al. | |
| 7,701,341 B2 | 4/2010 | Kumar et al. | |
| 7,774,485 B2* | 8/2010 | Patrick ................... | G06Q 10/06 709/229 |
| 7,822,860 B2* | 10/2010 | Brown .................... | H04L 29/06 707/609 |
| 7,944,355 B2 | 5/2011 | Kumar et al. | |
| 8,170,212 B2 | 5/2012 | Pering et al. | |
| 8,195,152 B1 | 6/2012 | Edwards | |
| 8,265,594 B2 | 9/2012 | Davis et al. | |
| 2003/0033369 A1* | 2/2003 | Bernhard ................. | G06F 8/67 709/203 |
| 2004/0098306 A1 | 5/2004 | Fitzpatrick et al. | |
| 2005/0044058 A1 | 2/2005 | Matthews et al. | |
| 2005/0050301 A1 | 3/2005 | Whittle et al. | |
| 2006/0020904 A1 | 1/2006 | Aaltonen et al. | |
| 2007/0239819 A1* | 10/2007 | Woods ................... | G06Q 30/02 709/201 |
| 2008/0287062 A1 | 11/2008 | Claus et al. | |
| 2009/0228820 A1 | 9/2009 | Kim et al. | |
| 2010/0049874 A1* | 2/2010 | Chene ............... | G06F 17/30569 709/246 |
| 2012/0174093 A1 | 7/2012 | Davila et al. | |
| 2013/0219263 A1 | 8/2013 | Abrahami | |

OTHER PUBLICATIONS

The International Search report and the Written opinion issued by USPTO on Sep. 30, 2015 for the International Patent Application No. PCT/US2015/038683.

The International Search report and the Written opinion issued by EPO on Dec. 3, 2015 for the International Patent Application No. PCT/US2015/050276.

GSM Association, "VoLTE Service Description and Implementation Guidelines, Version 1.1", www.gsma.com/network2020/wp-com, Mar. 26, 2014, pp. 1-121.

Anonymous et al., "FRITZ!Box 6842 LTE: Der Alleskönner mlt Voice-over-LTE", www.lte-anbieter.info/lte-news/fritzbox-6842-lte-der-alleskonner-mit-voice-over-lte, Feb. 27, 2013, pp. 1.

AVM GMBH, "FRITZ!Box 6842 LTE Einrichten und bedienen", img.billiger.de/dynimg/h5r90H8yeGyX90aFpmTDmHt4H9rycHjeBa9LTdXG2DA41-ZtYq5vi031VpqWBj4_HexpdHaC1z88YR5bxwk6-U/Bedienungsanleitung.pdf, May 1, 2014, pp. 1-212.

The International Search report and the Written opinion issued by Indian Patent Office on Jun. 22, 2015 for the International Patent Application No. PCT/IB2015/050451.

The International Search report and the Written opinion issued by European Patent Office on Oct. 20, 2016 for the International Patent Application No. PCT/US2016/044842.

Miller, "Facing the Challenge of Wireless Security", Computer, 2002, pp. 16-18, vol. m34, No. 7.

* cited by examiner

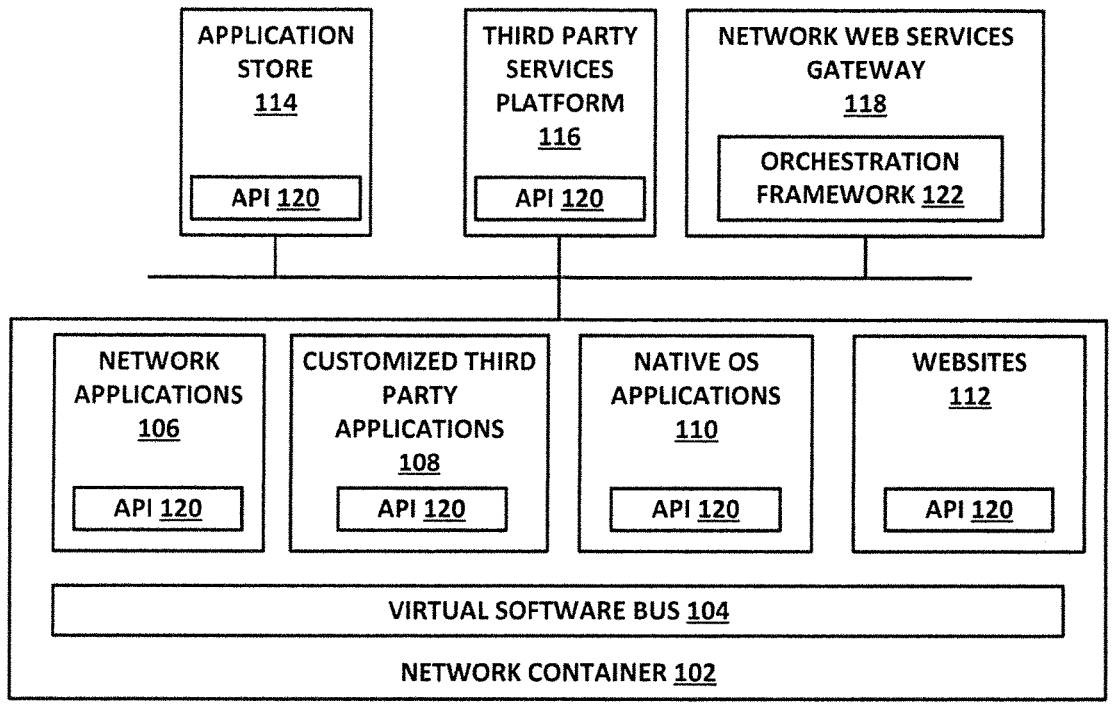
FIGURE 1    100
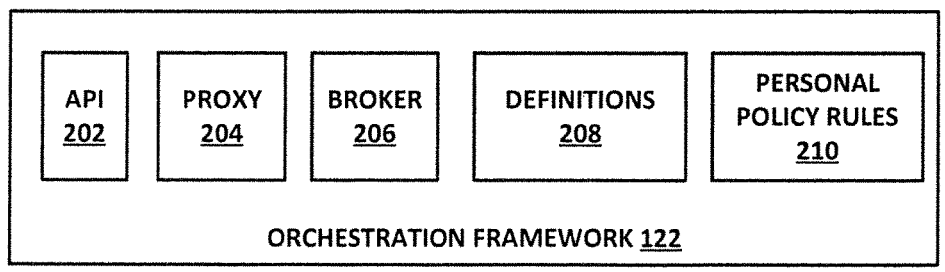
FIGURE 2    200

METHOD AND PROCEDURE FOR DYNAMIC SERVICES ORCHESTRATION THAT RUNS WITHIN AN ON-DEVICE SOFTWARE CONTAINER

RELATED APPLICATIONS

The present application is a continuation of U.S. patent application Ser. No. 13/922,045 filed Jun. 19, 2013, now U.S. Pat. No. 9,264,304, which claims benefit of U.S. Provisional Application No. 61/662,237, filed Jun. 20, 2012, entitled "METHOD AND PROCEDURE FOR DYNAMIC SERVICES ORCHESTRATION THAT RUNS WITHIN AN ON-DEVICE SOFTWARE CONTAINER," which is hereby incorporated by references for all purposes as if set forth herein in its entirety.

TECHNICAL FIELD

The present disclosure relates to application software, and more specifically to a method and system for dynamic services orchestration that runs within an on-device software container.

BACKGROUND OF THE INVENTION

A runtime environment on a mobile device consists of a variety of native services and applications that are embedded into the mobile device operating system. For example, in the Android operating system, there are predefined services for specific applications such as Google Search and Google Navigation, and the policy framework is hard coded. The services and policy framework embedded within mobile device operating system are pre-defined and not extensible to be modified/updated by third party applications, which makes it impossible to easily modify or update the operation of the device to accommodate new applications.

SUMMARY OF THE INVENTION

A system for providing network services is provided. The system includes a device configured to interface with the network to receive a container, where the container is configured to interface with an operating system of the device and a plurality of applications operating on the device. The container is further configured to interface with a network services provider of one or more network services and one or more third party service providers.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views, and in which:

FIG. 1 is a diagram of a system for providing a dynamic services orchestration framework in accordance with an exemplary embodiment of the present disclosure;

FIG. 2 is a diagram of a system for providing an orchestration framework in accordance with an exemplary embodiment of the present disclosure.

DETAILED DESCRIPTION OF THE INVENTION

Figure 3:
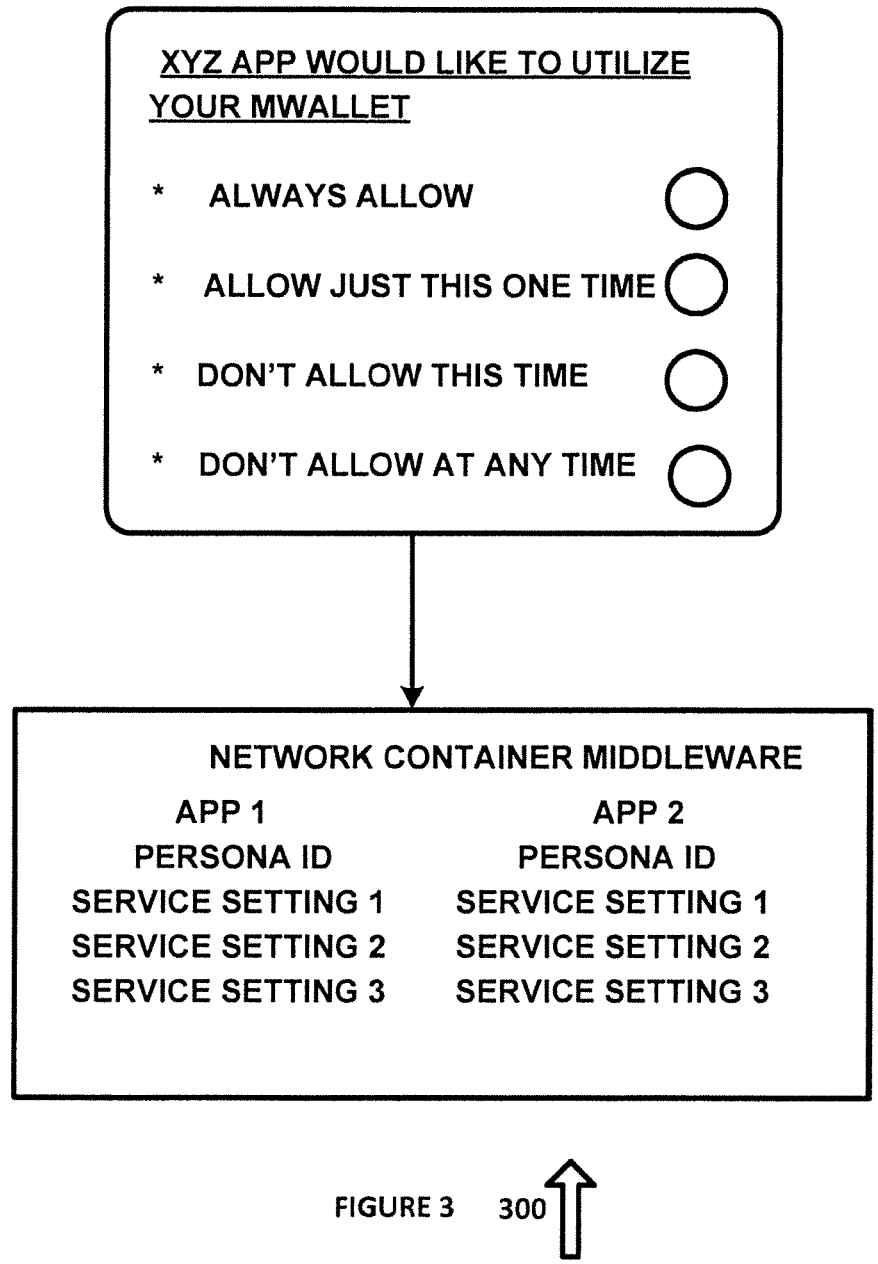
FIG. 3 is a diagram of a user settings control that can be enabled for user applications, such as to allow a user to configure their permissions settings for the services that an application can be used for each application that is running.

In the description that follows, like parts are marked throughout the specification and drawings with the same reference numerals. The drawing figures might not be to scale and certain components can be shown in generalized or schematic form and identified by commercial designations in the interest of clarity and conciseness.

The present disclosure includes a means to provide access to a defined set of services on a user's mobile device through a trusted software environment that can enforce business policy as it relates to specific service access for each unique third party applications and personal policy that is defined by the customer's settings for the utilization of services within each application.

FIG. 1 is a diagram of a system 100 for providing a dynamic services orchestration framework in accordance with an exemplary embodiment of the present disclosure. System 100 can be implemented in hardware or a suitable combination of hardware and software, and can be one or more software systems operating on one or more processors.

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications or on two or more processors, or other suitable software structures. In one exemplary embodiment, software can include one or more lines of code or other suitable software structures operating in a general purpose software application, such as an operating system, and one or more lines of code or other suitable software structures operating in a specific purpose software application. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections.

System 100 includes network container 102, which further includes virtual software bus 104 that can allow a suitable application or service loaded within network container 102 to connect to application store 114, third party services platform 116, network web services gateway 118 or other suitable systems or services. In one exemplary embodiment, application store 114, third party services platform 116 and network web services gateway 118 can be implemented in hardware or a suitable combination of hardware and software, and can be one or more software systems operating on one or more processors, such as a dedicated server, a cloud-implemented service or in other suitable manners.

Virtual software bus 104 facilitates the transport of data between the applications and services operating within network container 102 and centralized orchestration framework 122, which can be hosted at network web services gateway 118 or in other suitable locations (such as a single server or a cloud service). Orchestration framework 122 behaves both as a proxy and broker for the messages from other applications and services running within network container 102. A single application programming interface (API) 120 is used by network applications 106, customized third party applications 108, native operating system (OS) applications 110, websites 112 and the associated services provided by these applications and websites to interface with definitions for the applications and services, and to provide information enabling orchestration framework 122 to create the context for a sequence of events that determines the brokering and chaining of API requests to the various backend systems associated with the applications and websites, such as application store 114, third party services platform 116 and network web services gateway 118.

Network container 102 can be installed on a user device, such as a cellular telephone or tablet computer, either by the customer as an application that is downloaded over the air (OTA) onto their device, can be integrated into software that is pre-loaded onto the user device, or can be otherwise provided. Orchestration framework 122 provides a trusted software environment to enforce policies common across all applications and services as well as policies that are unique to any application or service. A personal policy can be defined by or for the customer for the utilization of services within each application.

In one exemplary embodiment, orchestration framework 122 can provide the following functions:
- enable applications and websites running on or accessed by a device with network container 102 to exchange information and interact with each other.
- enable applications and websites running on or accessed by a device with network container 102 to request API calls through orchestration framework 122 that are then brokered into a cloud service orchestration composition layer (such as a web services enterprise service bus), to access network capabilities such as quality of service (QOS), to access core IT platforms such as operations support systems (OSS) and business support systems (BSS) for customer account, billing, provisioning, identity, device information or other suitable functionality.
- enforce security policies for the services.
- manage policies that have been defined for each application or website that has the ability to utilize specific network or third party services.
- enable real time analytics to be provided on QOS metrics for network bandwidth, customer usage, application behavior or other function, such as for developers to utilize in their applications.
- enable applications and websites running on a device with network container 102 to request API calls that are then brokered into a defined third party back end platform interface (such as third party payment, cloud storage, data read/write retrieval, or other suitable back end platform interfaces).
- enforce personal policy for access to services.
- enforce policy rules that define which services can by utilized by specified applications associated with an active user persona.
- ensure that service API calls adhere to network technical standards.
- enable service and policy rules to be updated dynamically (via push or pull update methodology).
- enable the ability to change policy rules and enforcement dynamically to support scenarios such as an updated government privacy policy.

In one exemplary embodiment, network web services gateway 118 can update a service provided by or through a network application 106 from a first version to second version. In another exemplary embodiment, network web services gateway 118 can register services that can be utilized locally within the network on a device with network container 102, such as video, audio codecs, digital rights management or other suitable services. In another exemplary embodiment, network web services gateway 118 can registers service that are brokered by the network on a device with network container 102 to a back end network platform, such as third party payments, identity, news feeds, mapping, or other suitable services. In another exemplary embodiment, a third party can registers services that can be utilized locally within the network on a device with network container 102, such as video, audio codecs, digital rights management or other suitable services. In another exemplary embodiment, a third party can register services that are brokered by the network on a device with a network container 102 to a third party back end server, such as third party payments, identity, news feeds, mapping, or other suitable services. In another exemplary embodiment, network web services gateway 118 can publish a service such as VPN, private cloud access, enterprise email or other suitable services that can only be used by a device with network container 102.

FIG. 2 is a diagram of a system 200 for providing an orchestration framework in accordance with an exemplary embodiment of the present disclosure. System 200 includes orchestration framework 122 and API 202, proxy 204, broker 206, definitions 208 and personal policy rules 210, each of which can be implemented as hardware or a suitable combination of hardware and software, and which can be one or more software systems operating on a processor.

API 202 allows system 200 to interface with network applications 106, customized third party applications 108, native OS applications 110 and websites 112 through their corresponding APIs 120.

Proxy 204 provides proxy functionality for the applications and services running within and in conjunction with network container 102, such as to allow those applications and services to readily interact with each other and to apply rules to the interaction between applications and services. In one exemplary embodiment, proxy 204 can ensure continuity of operation in the event of intermittent communications with the device upon which network container 102 is operating.

Broker 206 provides broker services for messages from applications and services running within and in conjunction with network container 102. In one exemplary embodiment, broker 206 manages workload queues for multiple receivers.

Definitions 208 are used to provide the definitions for messages between applications and services, such as to facilitate implementation of applications and services for use with a device having network container 102. In one exemplary embodiment, definitions 208 provides a centralized location for definitions, to allow the definitions to be easily updated and coordinated.

Personal policy rules 210 allows a user, system administrator or other suitable person or system to control personal policy rules settings, such as to control system or application data or functionality that a user can access, to control the data or account functionality of a user that can be accessed by an application or service, or to provide other suitable functions.

FIG. 3 is a diagram of a user settings control 300 that can be enabled for user applications, such as to allow a user to configure their permissions settings for the services that an application can be used for each application that is running. In one exemplary embodiment, user setting control 300 can be generated by a display of a user device, such as using a touch screen display or other suitable interactive displays, and can include one or more user-selectable controls that are implemented as one or more objects having association data, graphic and functional attributes. The selectable permission settings can be enforced by network web services gateway 118 or orchestration framework 122 for applications and services operating in conjunction with network container 122. In this manner, the user policy settings can be stored in a cloud environment and transferable with the user.

In another exemplary embodiment, a full screen widget, such as a panel, can be provided to have defined criteria and settings that can either be pre-configured by the application developer or network, or to be configured by the users.

An exemplary use case could include an enterprise panel created for an enterprise that includes a VPN client, email, cloud directory access, intranet web browser URL access and video conference calling app. In this enterprise panel, the IT administrator for the enterprise can define which applications that have specific access to a private set of services to log-on and access company cloud services through the company firewall. The IT administrator can also define rules where the panel can't be modified (such as to bring in additional icon shortcuts).

In another exemplary embodiment, a dynamic contextual based policy framework can be provided. Examples of contextual based policies include:
- time of day—such as to allow an employer to find an employee during the work day
- location—such as to allow children to make purchases while at their school
- relationship of users—such as to allow of transfer of money to other people within the user's account
- Persona—such as to only allow a user's gaming friends to see the user's gaming activities In another exemplary embodiment, the network on-device services framework can be enabled to enforce a policy framework that is driven by a unique application ID that is assigned to permissions as granted by the network. If an application is requesting access to a service that it has not been granted permission to utilize by the network, then the network on-device services framework can enforce the policy and not allow the user to access to the requested service.

In another exemplary embodiment, the network can be configured to upload bulk advertising that is targeted/optimized for the network broadband customer in the background to the network on-device container of a user's device. The network container can have an advertising engine that will in real time broker and fulfill locally on the device, the applications advertising requests that are running in the network container. The network advertising engine can track all user behavior for the provided advertising and save the advertising delivery data for the network analytics platform.

In another exemplary embodiment, the ability to track all user activity of applications, websites and native OS apps and services running in the network container can be provided. User activity tracked can include the apps utilized, all screens accessed, services utilized and any interactions with other users. All user behavior for the provided advertising can be tracked and sent to the analytics platform.

In another exemplary embodiment, security for transactions can be enabled based on persona and access to specific services, within a persona such as business access to services, or in other suitable manners. For the transaction, a unique identifier within the data packets header can be utilized for specific level of security for access to services requiring strong protection such as payments, medical and financial information. The services orchestration layer can be utilized to create the unique identifier within the data packet header.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed is:

1. A system for providing a service over a network, comprising:
    one or more processors;
    a container disposed on the one or more processors configured to interface with an operating system of a device and a plurality of applications operating on the device, using an application programming interface (API) that is provided by the container;
    a third party services platform disposed on the one or more processors configured to operate on a processor to interface with the network and to provide data services to the device through the container API;
    a network web services gateway disposed on the one or more processors configured to provide authenticated access to the network for the device and the third party services platform;
    an orchestration framework disposed on the one or more processors configured to interface with the device, the third party services platform and the network web services gateway through an API of the orchestration framework; and
    wherein the orchestration framework comprises the orchestration framework API, a proxy, a broker, definitions and personal policy rules.

2. The system of claim 1 further comprising another third party services platform disposed on the one or more processors configured to interface with the network and to provide data services to the device through an API of the other third party services platform, and to interface with the third party services platform for one or more services through the API of the third party services platform.

3. The system of claim 1 wherein the network web services gateway is further configured to provide network data to the third party services platform based on one or more rules.

4. The system of claim 1 wherein the proxy is configured to provide proxy services for the device.

5. The system of claim 1 wherein the broker is configured to broker messages between the device and the third party services platform.

6. The system of claim 1 wherein the definitions comprise messages transmitted between the device and the third party services platform.

7. The system of claim 1 wherein the personal policy rules comprise one or more user-selectable policy rule settings.

8. The system of claim 1 wherein the container comprises network applications and customized third party applications.

9. The system of claim 1 wherein the container comprises network applications, customized third party applications and native operating system applications.

10. The system of claim 1 wherein the container comprises network applications, customized third party applications, native operating system applications and websites.

11. The system of claim 1 wherein the container comprises network applications.

12. The system of claim 1 wherein the container further comprises network applications, customized third party applications, native operating system applications and websites.

13. The system of claim 1 wherein the personal policy rules are configured to generate a user interface to allow a user to select one or more policy rule settings to allow a third party application to access personal network resources of the user under predetermined access conditions.

14. The system of claim 1 wherein the personal policy rules are configured to generate a user interface to allow a user to select one or more policy rule settings to allow a third party application to access data of the user under predetermined access conditions.

15. The system of claim 1 wherein the personal policy rules are configured to generate a user interface with a plurality of access selection controls to allow a user to select one or more policy rule settings to allow a third party application to access personal network resources of the user under predetermined access conditions.

16. A method for providing network services comprising:
installing a network container on a device using one or more processors;
configuring the one or more processors using one or more applications to allow the device to utilize an application programming interface (API) of the network container for data communications with a third party services platform;
configuring the third party services platform to use the network container API for data communications with the device;
transmitting a message for the third party services platform from the device to an orchestration framework using an API of the orchestration framework, wherein the orchestration framework comprises the orchestration framework API, a proxy, a broker, definitions and personal policy rules; and
transmitting the message for the third party services platform from the orchestration framework to the third party services platform.

17. The method of claim 16 further comprising generating a proxy of the device at the orchestration framework.

18. The method of claim 16 further comprising processing the message for the third party services platform with a message broker of the orchestration framework to perform workload queuing for the third party services platform.

19. The method of claim 16 further comprising:
receiving a request for network services from the third party services platform at the orchestration framework; and
generating a response to the request as a function of one or more policies.

20. The method of claim 16 further comprising:
receiving a request for user data from the third party services platform at the orchestration framework; and
generating a response to the request as a function of one or more personal policies.

* * * * *

UNITED STATES PATENT AND TRADEMARK OFFICE
CERTIFICATE OF CORRECTION

PATENT NO. : 9,628,572 B2  
APPLICATION NO. : 15/045109  
DATED : April 18, 2017  
INVENTOR(S) : Nathan A. Smith et al.

Page 1 of 1

It is certified that error appears in the above-identified patent and that said Letters Patent is hereby corrected as shown below:

On the Title Page

1. In Item (56), under "U.S. PATENT DOCUMENTS", in Column 2, Line 2, delete "Robertson" and insert -- Robertson et al. --, therefor.

2. On Page 2, in Item (56), under "U.S. PATENT DOCUMENTS", in Column 1, Line 3, delete "Patrick" and insert -- Patrick et al. --, therefor.

3. On Page 2, in Item (56), under "U.S. PATENT DOCUMENTS", in Column 1, Line 5, delete "Brown" and insert -- Brown et al. --, therefor.

4. On Page 2, in Item (56), under "U.S. PATENT DOCUMENTS", in Column 1, Line 17, delete "Woods" and insert -- Woods et al. --, therefor.

5. On Page 2, in Item (56), under "U.S. PATENT DOCUMENTS", in Column 2, Line 2, delete "Chene" and insert -- Chene et al. --, therefor.

6. On Page 2, in Item (56), under "OTHER PUBLICATIONS", in Column 2, Lines 10-12, delete "mlt Voice-over-LTE", www.lte-anbieter.info/lte-news/fritzbox-6842-lte-der-alleskonner-mit-voice-over-lte," and insert -- mit Voice-over-LTE", swww.lte-anbieter.info/lte-news/fritzbox-6842-lte-der-alleskonner-mit-voice-over-lte, --, therefor.

Signed and Sealed this  
Nineteenth Day of September, 2017

Joseph Matal  
*Performing the Functions and Duties of the*  
*Under Secretary of Commerce for Intellectual Property and*  
*Director of the United States Patent and Trademark Office*